United States Patent
Nutsos

(10) Patent No.: US 9,382,695 B2
(45) Date of Patent: Jul. 5, 2016

(54) WATER CIRCULATION SYSTEM FOR PREVENTING THE GROWTH OF MICRO-ORGANISMS

(75) Inventor: Mikael Nutsos, Tullinge (SE)

(73) Assignee: ZEONDA AB, Uppsala (SE)

(*) Notice: Subject to any disclaimer, the term of this patent is extended or adjusted under 35 U.S.C. 154(b) by 318 days.

(21) Appl. No.: 13/120,251

(22) PCT Filed: Sep. 25, 2008

(86) PCT No.: PCT/SE2008/051072
§ 371 (c)(1),
(2), (4) Date: Mar. 22, 2011

(87) PCT Pub. No.: WO2010/036160
PCT Pub. Date: Apr. 1, 2010

(65) Prior Publication Data
US 2011/0174404 A1    Jul. 21, 2011

(51) Int. Cl.
*E03B 7/12*   (2006.01)
*E03C 1/02*   (2006.01)
(Continued)

(52) U.S. Cl.
CPC . *E03B 7/09* (2013.01); *E03B 1/048* (2013.01); *E03B 7/045* (2013.01); *E03B 7/12* (2013.01); *E03C 1/023* (2013.01); *F24D 17/0073* (2013.01); *F24D 17/0078* (2013.01); *G05D 23/015* (2013.01); *B05B 1/18* (2013.01); *Y10T 29/49716* (2015.01); *Y10T 137/0379* (2015.04); *Y10T 137/2688* (2015.04); *Y10T 137/6497* (2015.04); *Y10T 137/7737* (2015.04); *Y10T 137/85954* (2015.04); *Y10T 137/86485* (2015.04)

(58) Field of Classification Search
CPC .......... E03B 7/045; E03B 7/12; E03B 1/048; E03C 1/023; F24D 17/0078; Y10T 137/7737; Y10T 137/85954; Y10T 137/0379; Y10T 137/6497; Y10T 137/2688
USPC .......... 137/563, 119.06, 337, 468, 12
See application file for complete search history.

(56) References Cited

U.S. PATENT DOCUMENTS 1,855,359 A * 4/1932 McNamara .............. 137/607
3,667,503 A * 6/1972 Farrell ............... F16K 11/0655
                                                         137/625.4
(Continued)

FOREIGN PATENT DOCUMENTS

CN    2716693 Y    8/2005
GB    2267664 A    12/1993
(Continued)

OTHER PUBLICATIONS

International Search Report, dated Jun. 10, 2009, from corresponding PCT application.
(Continued)

*Primary Examiner* — Atif Chaudry
(74) *Attorney, Agent, or Firm* — Young & Thompson

(57) ABSTRACT

A water circulation system for hospitals and other facilities with large water circulating systems. A pressure and/or flow sensitive valve directs low pressure, high temperature water in the outlet head to a return pipe, while directing high pressure water to water outlet openings. The system allows a constant flow of heated water above 55° C. past water outlet heads even when the water system is not in use, thus avoiding static water in pipe lines and the growth of microorganisms.

13 Claims, 1 Drawing Sheet

(51) Int. Cl.
*F24D 17/00* (2006.01)
*E03B 7/09* (2006.01)
*E03B 1/04* (2006.01)
*E03B 7/04* (2006.01)
*G05D 23/01* (2006.01)
*B05B 1/18* (2006.01)

(56) References Cited

U.S. PATENT DOCUMENTS 5,564,462 A * 10/1996 Storch ............................ 137/337
5,738,135 A * 4/1998 Johnson .................... 137/119.06
6,449,784 B1 * 9/2002 Pelletz ............................... 4/675
6,598,616 B2 * 7/2003 Nutsos ........................... 137/337
2006/0151622 A1 7/2006 Nutsos
2010/0092164 A1 * 4/2010 Ziehm ........................... 392/485

FOREIGN PATENT DOCUMENTS

SE          525795 C2      4/2005
WO          03/010453 A1   2/2003
WO          2005/124236 A2 12/2005

OTHER PUBLICATIONS

Chinese Office Action, dated Mar. 4, 2013, from corresponding PCT application.

* cited by examiner

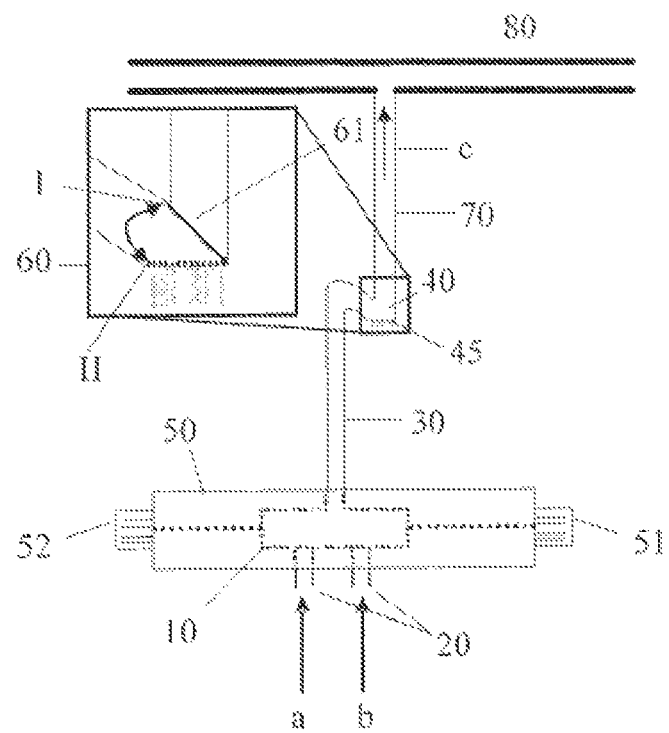

WATER CIRCULATION SYSTEM FOR PREVENTING THE GROWTH OF MICRO-ORGANISMS

FIELD OF THE INVENTION

The invention relates to a water supply system comprising a water exit opening and a cold and hot water mixer unit arranged to achieve thermal disinfection of both the water exit opening and mixer unit. This is achieved by circulating water, which normally would be stationary, in the pipe work between the mixer unit and the water outlet.

BACKGROUND OF THE INVENTION

A problem with many water supply systems is the presence of micro-organisms in the system. These organisms may accumulate and reproduce at sites where the water stands still, for example at shower heads, faucets, sprinklers and so on. Static water in pipes at hospitals, military camps, sports centres, office complexes etc may cause growth and spread of harmful bacteria, for example *Legionella* bacteria. These, and other bacteria, may multiply under static conditions and at temperatures approximately between 20-50° C. Temperatures over 55° C. have been found to reduce or even eliminate bacterial growth.

The prior art suggests many ways of limiting the spread of bacteria or eliminating the existence of bacteria. WO 05/124236 describes a filter and radiation system. By placing the filter prior to the radiation step most of the bacteria, or other organisms, are captured and therefore only radiation sources of relatively low intensity are needed to deactivate the micro-organisms. Document '236 also describes that the radiation may be altered to adapt to the exposure time. For example, a higher intensity is needed for deactivating the running water coming from the filter compared to the static water around the tapping point (e.g. shower head, faucet, sprinkler). The drawbacks of '236 are the need of a radiation source and that the filter will either become clogged after a while and thereby becomes dysfunctional, or needs to be disposable. The latter is impractical, usually cost ineffective, not environmentally friendly, and there is a risk of dislodging the captured bacteria.

US-06/0151622 describes a solution to the problem by presenting a system where there is a constant water flow in the pipes, thereby avoiding static points. Additionally, the circulating water is maintained outside the critical temperature zone for bacteria multiplication of 20-50° C. Document '622 describes a system where hot water and cold water inlet pipes are connected to a return water pipe via a thermostat. The thermostat is set at an appropriate temperature, above or below a critical temperature, to control the temperature of the return water flow. Additionally, water flow adjustment valves may be placed prior to the thermostat for controlling the flow in the water return pipe.

Obviously there is a need for systems that can provide a constant flow and that can maintain a critical water temperature to reduce the risk of spreading of *Legionella* and other bacteria. The system should also be uncomplicated with minimum extra piping. The present invention provides such a system and is also applicable to many conventional water supply systems.

SUMMARY OF THE INVENTION

The object of the present invention is to present an apparatus which may minimize the growth and spread of micro-organisms such as *Legionella* bacteria, in water supply systems. The object is to provide an uncomplicated construction that can be used in any suitable application.

At least some of the drawbacks of the prior art are overcome by the apparatus.

By having a constant flow of water (preferably at a temperature above 55° C.) in the water supply system the object of the present invention can be accomplished. A constant flow is achieved by having a mixing valve, for example provided in a mixer unit, and a pressure or flow sensing valve placed prior to the water exit opening. When the system is in use, for example when somebody is taking a shower, the mixing valve is operated to provide a high flow rate of water at a suitable working pressure. This working pressure or high flow rate causes the pressure or flow sensing valve to move to a first position that allows water from the mixing valve to flow towards, and out of, the water exit opening. When the system is no longer is use the water flow is restricted to a predetermined leakage flow through the mixing valve which is at a low pressure which causes the pressure or flow sensing valve to move to a second position which prevents water flowing through the water exit opening and instead allows the water leaking through the mixing valve to flow into a water return pipe.

The present invention provides an uncomplicated way to disinfect a water supply system and is compatible with many existing conventional water supply systems.

BRIEF DESCRIPTION OF THE FIGURES

The drawing FIGURE shows a schematic view over a first embodiment of a water supply system according to the present invention.

DETAILED DESCRIPTION OF THE INVENTION

The purpose of the present invention is to provide a water circulation system that reduces the risk of growth and accumulation of micro-organisms in the pipes. The issue of micro-organism growth in circulating water systems is very important in residential, commercial and healthcare buildings such as apartment blocks, office buildings, hotels and hospitals. Today most such buildings have an in-house water circulating system where the water has a temperature above 50° C., usually around 57° C., to avoid growth and accumulation of micro-organisms. Individual water exit openings such as taps and showers heads in such systems however may be unused for periods of time and the static water in such water exit openings and their associated pipe work may encourage bacterial growth.

The drawing FIGURE illustrates schematically a first embodiment of a water supply system 80 according to the present invention. The system comprises a mixer unit 50 for supplying water to a water outlet head e.g. shower head 40 or a faucet or the like. The water outlet head comprises one or more water exit openings 45. Hot and cold water enters the mixing unit 50 and exits into the pipe 30.

When in the open position (i.e. when someone is taking a shower) the mixer unit operates as usual and gives a flow rate (e.g. 0.2 liters per second) which is in accordance with the building and sanitary codes for the country that it is being used in. The water flowing to the shower can have a suitable working pressure of e.g. 6 bar. The mixer unit can, depending on how it is adjusted, supply water at safe temperatures between, for example, 14° C. and 38° C. The water pressure (and hence the flow rate) and temperature can be altered through the flow and temperature regulators 51 or 52, respectively.

In a first embodiment of the present invention a pressure and/or flow sensing valve 60, which may be mechanically, hydraulically or electronically operated, is provided prior to or inside the water outlet head 40. Additionally, a mixing valve 10 is provided and can be situated in the mixing unit 50. The pressure and/or flow sensing valve 60 is arranged to be able to move between two extreme positions where at a first extreme position it allows all the water to flow out of the water outlet head 40 via its water exit openings 45 and at the second extreme position it allows all the water to flow into the water return pipe 70. Pressure and/or flow sensing valve 60, is shown here schematically provided with a flap 61 but other forms of valves suitable for controlling the flow of water are also conceivable. Pressure and/or flow sensing valve 60 can move the flap 61 between a first position I and a second position II depending on the water pressure. At high pressures and/or flow rates, as when the mixer unit is fully opened, the mixing valve 10 is fully opened and the pressure and/or flow sensing valve 60 moves the flap 61 to the first position I and the water is allowed to exit through the water exit opening 45. When the mixer unit is closed, i.e. when nobody is taking a shower for example, the mixing valve 10 allows a low pressure (e.g. 0.1 bar) low flow rate of water at a high temperature, above 55° C., preferably 57° C. This is achieved by, for example, adjusting the mixing valves in the mixer unit 50 for incoming hot water and cold water to permit a predetermined leakage past them. The pressure and/or flow sensing valve 60 will then detect a drop in water pressure and/or the low flow rate and at a predetermined, reduced, pressure value or flow rate, the pressure and/or flow sensing valve 60 will move the flap 61 to the second position II preventing the water from exiting through the water exit opening 45. Instead, the water flows past the water outlet head and then into the water return pipe 70. There still is a constant water flow in the whole system, preferably including the water outlet head, but preferably no water exits through the water exit opening 45. Hence, the accumulation and reproduction of micro-organisms can be reduced in the whole system, including the water outlet head. Thus in the second position II, the pressure and/or flow sensing valve 60 will at the same time enable water to enter into return water pipe 70 while preventing water from exiting through the water exit opening 45. The return water pipe can be connected to the overall in-house circulating water system 80. Since there is a constant flow in the system, including the water outlet head, the system can easily be disinfected through addition of disinfection chemicals or other additives. That is, if the system, for some reason, local or systematic, fails to keep the necessary temperature for example, disinfection additives may easily be added to restore the system.

To avoid the risk of scalding an anti-scalding device may be provided to preventing the heated circulating water to exit from the water exit opening 45 during the first few seconds after the mixer unit is operated by a user who wishes to use the shower or faucet or the like.

In a second embodiment the mixer valve 10 is provided in the mixer unit 50.

According to a third embodiment, the present invention provides a method of modifying existing water supply systems comprising the steps of providing a leaky mixer valve, preferably provided in the mixer unit, prior to a pressure and/or flow sensitive valve provided prior to or inside a water outlet head to ensure a constant flow. Thus the mixer unit is connected to both hot and cold water supplies as normal. The only extra piping needed is a pipe between the valve in the shower head and the system return pipe. Normally in buildings such as hospitals and hotels the system return pipe is position close to bathrooms—either in the roof space or the corridor outside the room—and thus connecting this extra piping is relatively cheap and easy.

The invention claimed is:

1. A water circulation system for reducing growth of micro-organisms in water supply systems, comprising:
    at least one water inlet pipe and water outlet head comprising one or more water exit openings;
    a return water pipe;
    a pressure or flow sensing valve provided prior to or inside the water outlet head; and
    a mixing valve provided prior to the pressure or flow sensing valve, where said pressure or flow sensing valve is arranged to be able to move between two extreme positions where at a first extreme position said pressure or flow sensing valve allows all the water to flow out of the water outlet head via water exit openings and at the second extreme position said pressure or flow sensing valve allows all the water to flow into the return water pipe,
    wherein when the system is in use, or when someone is taking a shower, the mixing valve is operable to provide a high flow rate or pressure of water so that the mixing valve causes the pressure or flow sensing valve to be actuated at a first pressure so as to allow all the water to flow through the water exit openings, and when the system is not in use, the mixing valve is operable to provide a low pressure, which causes the pressure or flow sensing valve to allow all the water into the water return pipe, and the return pipe is further connected to the circulating water system so as to allow a constant flow of circulating water in the system,
    whereby static water in the system is avoided and the growth of micro-organisms in the system is reduced.

2. The water circulation system according to claim 1, wherein the pressure or flow sensing valve is mechanically, hydraulically or electronically operated.

3. The water circulation system according to claim 1, wherein the mixing valve is placed in a mixer unit.

4. The water circulation system according to claim 1, wherein the system is configured for water having a temperature greater than 50° C.

5. The water circulation system according to claim 1, wherein the pressure or flow sensing valve is provided with a flap that can move from the first extreme position to the second extreme position.

6. A method of modifying existing water supply systems, comprising:
    providing a mixer valve and a pressure or flow sensing valve where said pressure or flow sensing valve is arranged to be able to move between two extreme positions where at a first extreme position said pressure or flow sensing valve allows all the water to flow out of a water outlet head via water exit openings and at the second extreme position said pressure or flow sensing valve allows all the water to flow into a water return pipe, and the mixing valve is operable to provide, when the system is in use, or when someone is taking a shower, a high flow rate or pressure of water so that the mixing valve causes the pressure or flow sensing valve to be actuated at a first pressure so as to allow all the water to flow through the water exit openings, and to provide, when the system is not in use, a low pressure, which causes the pressure or flow sensing valve to allow all the water into the water return pipe, and the return pipe is further connected to the circulating water system so as to allow a constant flow of circulating water in the system, whereby static water in the system is avoided and the growth of micro-organisms in the system is reduced.

7. The method according to claim 6, wherein the mixer valve is provided in a mixer unit.

8. The method according to claim 6, wherein the pressure or flow sensing valve is provided inside a water outlet head.

9. The method according to claim 6, wherein the water has a temperature greater than 50° C.

10. The method according to claim 6, wherein the pressure or flow sensing valve is provided with a flap that can move from the first extreme position to the second extreme position.

11. A water circulation system for reducing growth of micro-organisms in water supply systems, comprising:
   a hot water inlet pipe and a cold water inlet pipe entering a mixer unit;
   a flow regulator in the mixer unit;
   a temperature regulator in the mixer unit;
   a pipe exiting the mixer unit;
   a water outlet head comprising one or more water exit openings;
   a return water pipe;
   a pressure or flow sensing valve provided prior to or inside the water outlet head, the pressure or flow sensing valve being arranged to be able to move between two extreme positions where at a first extreme position said pressure or flow sensing valve allows all the water to flow out of the water outlet head via water exit openings and at the second extreme position said pressure or flow sensing valve allows all the water to flow into the water return pipe; and
   a mixing valve provided prior to the pressure or flow sensing valve, where said pressure or flow sensing valve is actuatable at a first predetermined pressure or flow to allow all the water to flow through the water exit opening, and is actuatable at a second, lower predetermined, pressure or flow to allow all the water to flow into the water return pipe via the water outlet head,
   wherein when the system is in use, or when someone is taking a shower, the mixing valve is operable to provide a high flow rate or pressure of water so that it causes the pressure or flow sensing valve to be actuated at said first pressure so as to allow all the water to flow through the water exit openings, and when the system is not in use, the mixing valve is operable to provide a low pressure, which causes the pressure or flow sensing valve to allow all the water into the water return pipe, and the return pipe is further connected to the circulating water system so as to allow a constant flow of circulating water in the system,
   whereby static water in the system is avoided and the growth of micro-organisms in the system is reduced.

12. The water circulation system according to claim 11, wherein the system is configured for water having a temperature greater than 50° C.

13. The water circulation system according to claim 11, wherein the pressure or flow sensing valve is provided with a flap that can move from the first extreme position to the second extreme position.

* * * * *